Feb. 7, 1928.  
P. C. SHIRIA  
1,658,691

SUPPORT FOR CIRCULAR SAW SHARPENING MACHINES

Original Filed Dec. 7, 1925

INVENTOR  
PETER CLARNCE SHIRIA  
BY Fetherstonhaugh & Co  
ATTORNEY

Patented Feb. 7, 1928.

1,658,691

UNITED STATES PATENT OFFICE.

PETER CLARNCE SHIRIA, OF POWELL RIVER, BRITISH COLUMBIA, CANADA.

SUPPORT FOR CIRCULAR-SAW-SHARPENING MACHINES.

Application filed December 7, 1925, Serial No. 73,770. Renewed November 9, 1927.

My invention relates to improvements in supports for circular saw sharpening machines, the objects of which are to provide means whereby a circular saw may be truly centered on a sharpening machine so that all teeth may be accurately ground equidistant from the saw centre, whereby grit from the grinding wheel is prevented from cutting the saw supporting means and the central aperture of the saw, and to provide means whereby the saw centering means is arranged to rotate with the saw as the saw is moved from tooth to tooth against the grinding wheel.

The invention consists essentially of a sleeve rotatable upon the saw spindle having a cone thereon which is adapted to enter the central aperture of the saw and means for holding the cone in engagement with the saw, as will be more fully described in the following specification, in which:—

In the drawings like characters of reference indicate corresponding parts in each figure.

Figure 1:
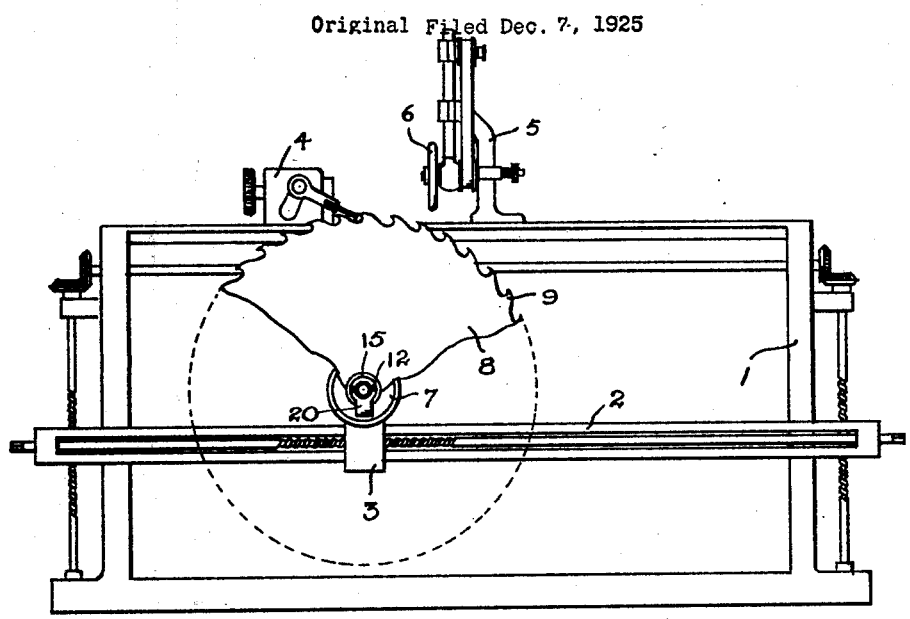
Fig. 1 is a general view of a circular saw sharpening machine showing part of a saw in position for sharpening.
Figure 2:
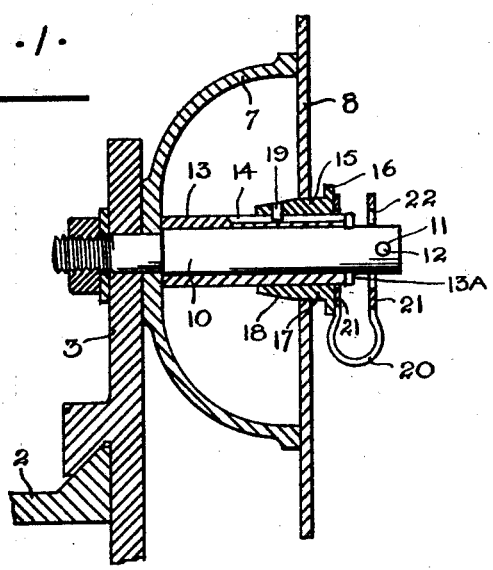
Fig. 2 is a sectional view of the saw support.

The numeral 1 indicates generally a saw sharpener frame having an adjustable horizontal member 2 upon which a support head 3 is endwise movable. Suitably positioned upon the frame 1 is a device 4 which at each actuation is adapted to impart partial rotation to the saw equal to the length of one tooth, and 5 is a grinder having a grinding wheel 6 which is adapted to grind the teeth as they are moved into position thereunder. Mounted upon the support head 3 is a cup 7, see Figure 2, the face of which forms a bearing for one side face of the saw 8 to hold it against transverse movement when its teeth 9 are being ground by the wheel 6. Secured to the support head 3 and projecting through the cup 7 is a stationary spindle 10 having an aperture 11 adjacent its outer end through which a removable pin 12 is adapted to extend, the purpose of which will hereinafter appear.

The numeral 13 indicates a sleeve suitably held against longitudinal movement by a pin 13ᴬ and rotatably mounted upon the spindle, which is of such a length as to reach to the bottom of the cup and project outwards beyond the saw face to prevent filings and grit from the grinder falling upon the spindle to such an extent as to produce undue wear to the bearing surfaces. The sleeve is provided with a keyway 14 of lesser depth than the thickness of the sleeve wall. Mounted upon the sleeve is a cone, generally indicated by the numeral 15, adapted to fit the hole of the saw and having a flange 16 at its outer end and being a slow taper 17 intermediate its length and a relatively quick taper 18 at its inner end. The cone is provided with a pin 19 extending through its side wall which is adapted to engage the keyway 14 so as to permit of longitudinal movement of the cone along the sleeve 13 to provide for centering the saw thereon and for bringing the inner face of the saw into contact with the face of the cup 7, the engagement of the pin 19 with the keyway 14 causes the cone 15 and the sleeve 13 to rotate as a unit.

The numeral 20 indicates generally, a spring clip which is preferably formed U-shaped and having a pair of blades 21 which are apertured as at 22, such apertures being slightly larger than the spindle 10 onto which it is fitted and held in position by the pin 12 extending through the spindle. One blade 21 of the clip is adapted to bear upon and to exert a resilient pressure on the flange 16 of the cone 15 to thrust it as far as the cone surfaces 17 and 18 will permit into the hole of the saw 8, thereby accurately centering the saw about the spindle to the end that the teeth 9 may all be ground equidistant from the saw centre.

It will thus be seen that I have devised a means for supporting a circular saw upon a grinding machine, which is adapted to firmly engage the saw whereby the several parts forming the support do not rotate about each other, hence grit falling from the grinding wheel onto the cone or sleeve cannot produce wear, which in machines of present construction renders frequent replacement of cones necessary.

What I claim as my invention is:

1. In a circular saw sharpening machine, a saw supporting spindle having a rotatable sleeve, a cone adjustable longitudinally of the sleeve upon which the saw is adapted to be centered, said cone having a quick entering taper and a slow engaging taper, means for preventing rotation of the cone about the sleeve and means for holding the cone in engagement with the saw.

2. In a circular saw sharpening machine, a saw supporting spindle having a rotatable sleeve, a cone adjustable longitudinally of the sleeve upon which the saw is adapted to be centered, means for preventing rotation of the cone about the sleeve, and spring means carried by the spindle adapted to exert a pressure upon the cone to hold it in driving engagement with the saw.

3. A saw supporting and clamping device for circular saw sharpening machines comprising a rotatably mounted sleeve, a member at one end of the sleeve adapted to engage one side of a circular saw, a saw centering and supporting element slidably mounted on the sleeve to rotate therewith adapted to engage in the central orifice of the circular saw and to hold the saw to the aforesaid member and a spring arranged to press against the outer end of said centering and supporting element to hold the latter to the saw.

4. A saw supporting and clamping device for circular saw sharpening machines comprising a fixed spindle, a non-sliding sleeve rotatably mounted thereon, a member mounted on the spindle at the inner end of the sleeve and adapted to engage one side of a circular saw blade having a central orifice receiving the spindle and sleeve therethrough, a cone slidably mounted on the sleeve to turn therewith and having its outer surface siutably tapered to engage in the central orifice of the saw to support and center the latter, abutment means carried by the outer end of said spindle, and spring pressure exerting means confined in compression between said abutment means and the outer end of said cone.

Dated at Vancouver, B. C., this 16th day of November, 1925.

PETER CLARNCE SHIRIA.